United States Patent [19]

Bosman et al.

[11] Patent Number: 5,220,224
[45] Date of Patent: Jun. 15, 1993

[54] STEPPER MOTOR WITH INTEGRATED ASSEMBLY

[75] Inventors: Edward T. Bosman, Cheshire; Karla C. Pratt, Wolcott; Philip G. Atiyeh, Cheshire; John F. Rutledge, Plantsville, all of Conn.

[73] Assignee: North American Philips Corporation, New York, N.Y.

[21] Appl. No.: 943,364

[22] Filed: Sep. 10, 1992

Related U.S. Application Data

[62] Division of Ser. No. 817,034, Dec. 30, 1991.

[51] Int. Cl.$^5$ .................................. H02K 37/14
[52] U.S. Cl. ........................... 310/49 R; 310/71
[58] Field of Search ............. 310/49 R, 71; 336/192

[56] References Cited

U.S. PATENT DOCUMENTS

4,720,646  1/1988  Torimoto .................. 310/71
4,825,112  4/1989  Mineyama ................ 310/71

Primary Examiner—Emanuel T. Voeltz
Assistant Examiner—Judson H. Jones
Attorney, Agent, or Firm—Robert J. Kraus

[57] ABSTRACT

A stepper motor of the permanent-magnet sheet-metal type is constructed of a number of modules, simplifying assembly. The modular parts include a stator having integrally-molded winding bobbins and pole pieces. A rotor mounted in the stator includes a barrier member which separates a plastic, threaded hub molded interiorly from a permanent magnet molded exteriorly. A shaft having a first threaded end rotatably engaged with the interior of the rotor hub has a rectangular central portion extending through a rectangular opening of the stator to convert rotary motion of the rotor to linear motion of the shaft. An opposite end of the shaft includes a molded head and a tubular shield extending from the head. This shield and a tubular portion of the stator molding define a labyrinthal passage which inhibits the passage of contaminants into the rotor. A housing of the motor and a rotatably attached flange include engagable portions to lock the flange at a desired angular position.

4 Claims, 7 Drawing Sheets

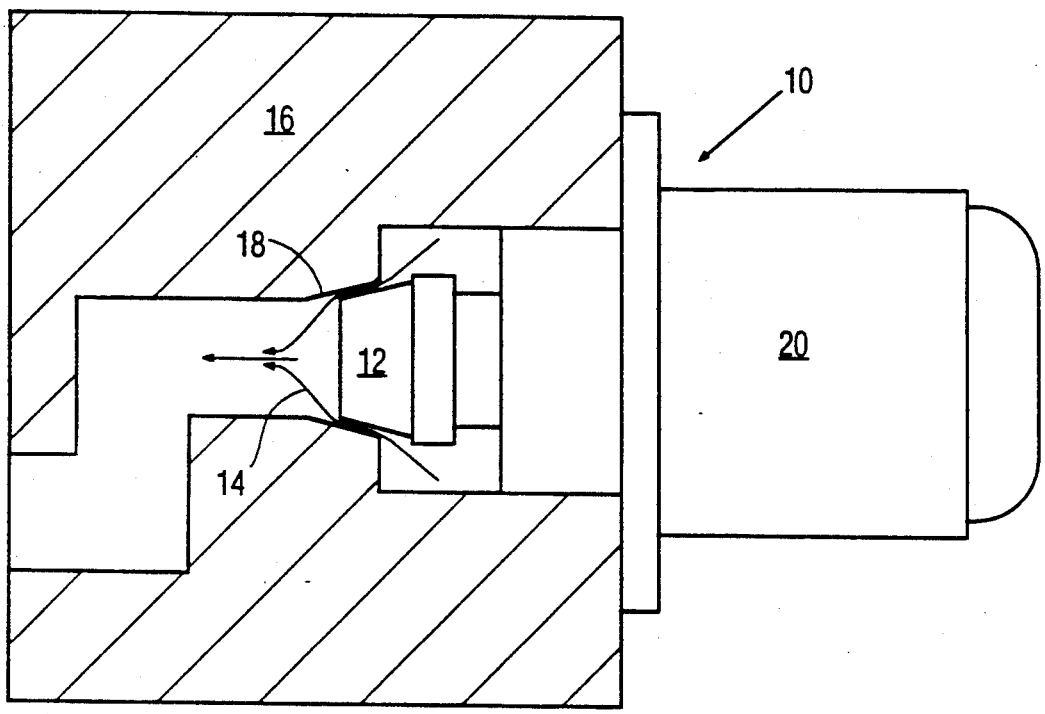
FIG. 1
PRIOR ART
FIG. 7
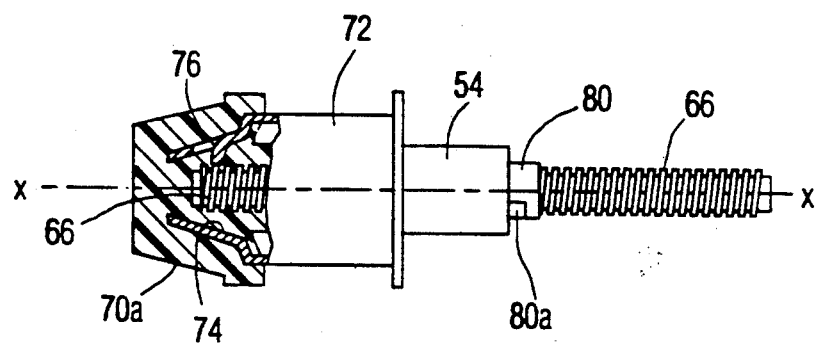

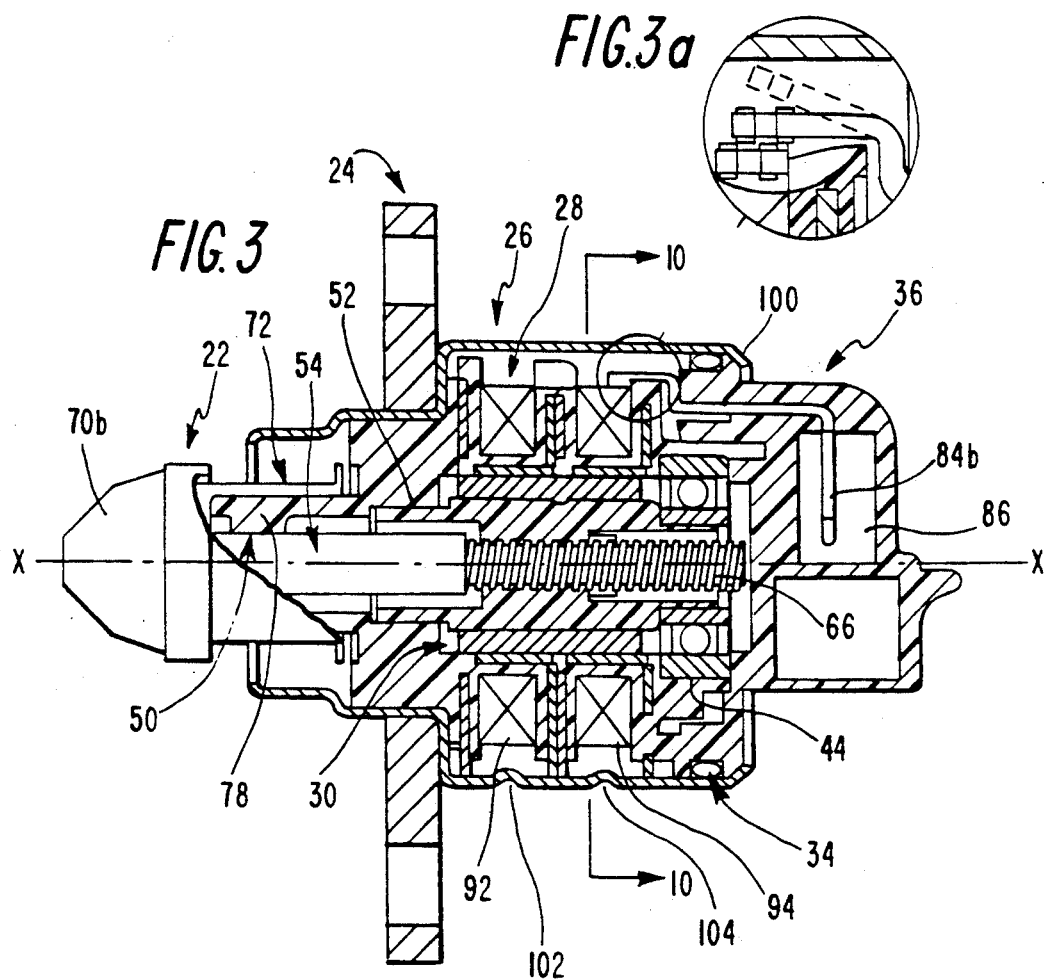
FIG. 3
FIG. 3a
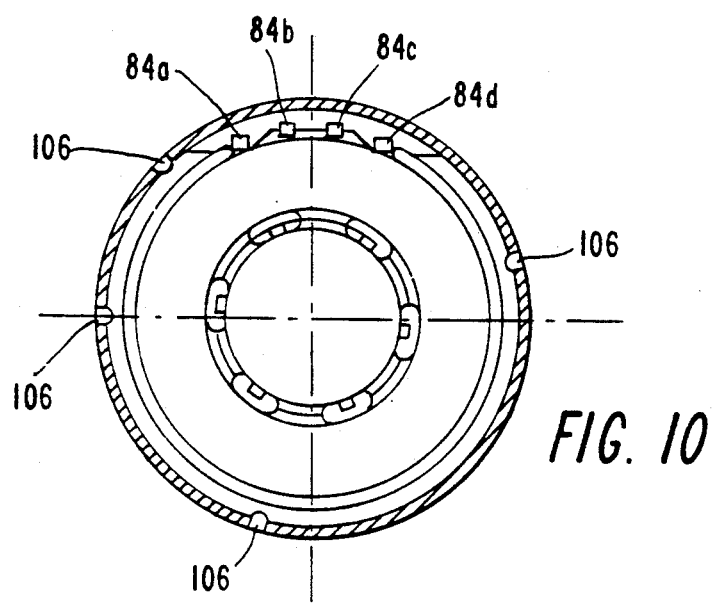
FIG. 10

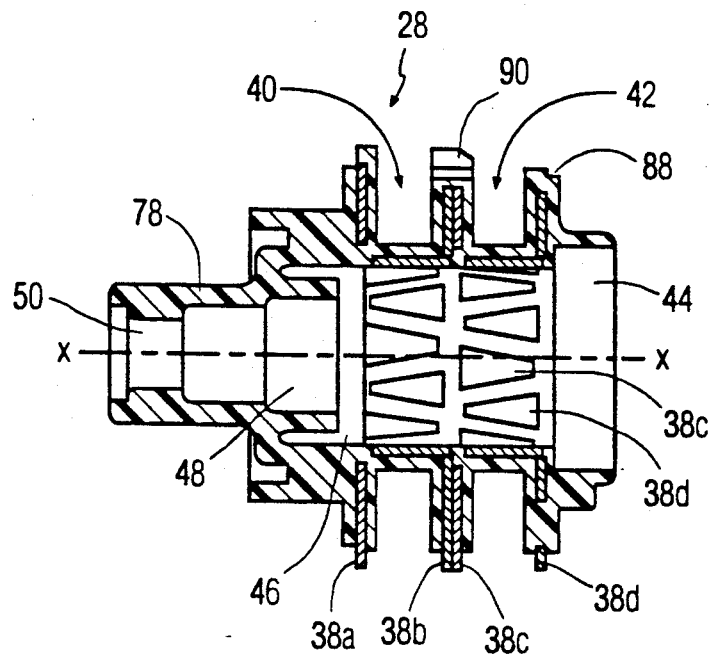
FIG. 4
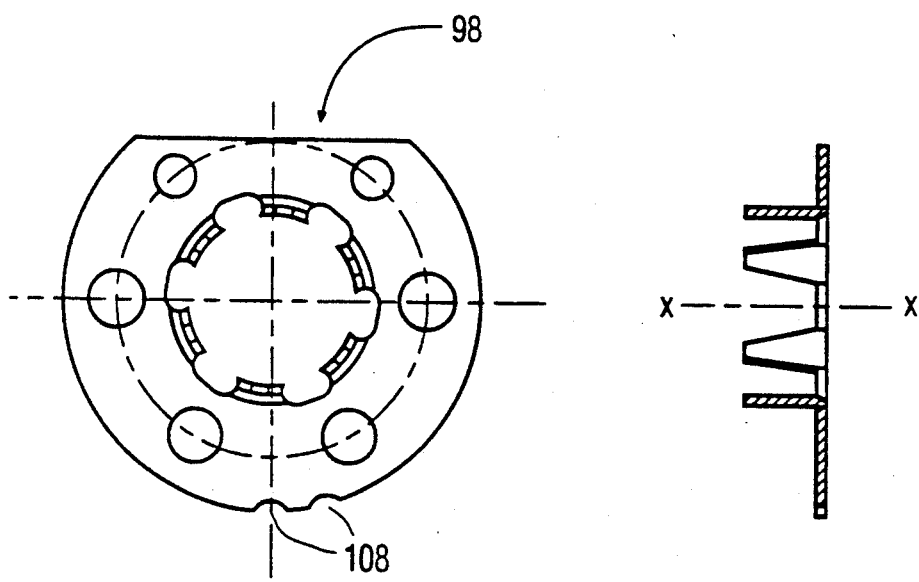
FIG. 5a  FIG. 5b

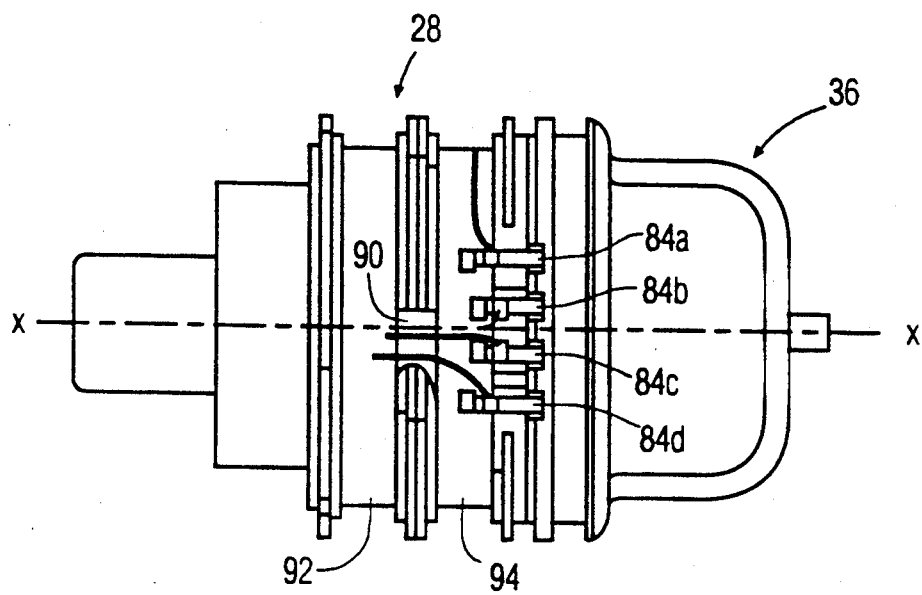
FIG. 8
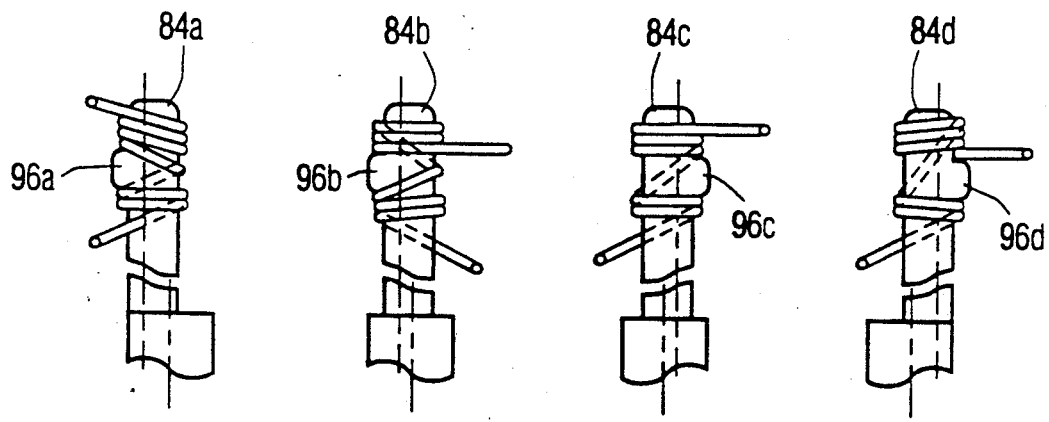
FIG. 9a   FIG. 9b   FIG. 9c   FIG. 9d

STEPPER MOTOR WITH INTEGRATED ASSEMBLY

This is a division of application Ser. No. 07/817,034, filed on Dec. 30, 1991, pending Dec. 23, 1992.

BACKGROUND OF THE INVENTION

1. Field of the Invention

This invention relates to stepper motors, and in particular to permanent-magnet sheet-metal type stepper motors.

2. Description of Related Art

Stepper motors include a stator for producing a rotating multipole magnetic field and a multipole rotor for rotating about a central axis of the stator in synchronism with the rotating field. Typically the rotating magnetic field is effected by applying electrical pulses of continually changing phase to respective windings of the stator. Further details of typical stepper motor structure, operation and drive circuitry can be obtained from a publication entitled AIRPAX Stepper Motor Handbook published by Airpax Company, 604 West Johnson Avenue, P.O. Box 590, Cheshire, Conn., U.S.A.

Because such a motor is capable of converting electrical pulses into discrete mechanical rotational movements, it is particularly useful for controlling the rotary or linear position of an object coupled to its rotor. An example of one linear application which takes advantage of this capability is illustrated in FIG. 1. This Figure shows a stepper motor 10 which has been made by Airpax Company (part number A95228) for controlling the linear position of a shaped head 12 to control airflow 14 in a throttle body 16 of an internal combustion engine (not shown). The external surface of the head 12 is precisely shaped to conform to a neck surface 18 of the throttle body so that the linear position of the head regulates the magnitude of a clearance between the two surfaces.

Although it is not shown in FIG. 1, the head 12 is attached to a shaft which has a threaded end engaging an internal thread of the rotor in the stator contained in the motor housing 20. The shaft is prevented from rotating with the rotor by means of a separate part which has fingers projecting into respective longitudinal grooves in the shaft. The separate part is attached to an end of the stator, which itself includes a number of parts held together in two outer shell members which are fastened together. This arrangement functions well, but is complicated to assemble. Such complicated assembly of numbers of individual parts typifies the motor.

SUMMARY OF THE INVENTION

It is an object of the invention to provide a stepper motor of simple modular construction which may be easily and reliably assembled.

In accordance with a first feature of the invention the stator has a central axis and comprises a monolithically-molded assembly including a plurality of multi-pole pieces embedded in a molding of insulating material. The molding defines at least one circumferential winding-holding channel disposed about the axis; an inner, axially-extending opening for receiving at least a portion of the rotor; a first axial end having bearing-holding means; and a second axial end comprising a bearing portion having a bearing surface with a circular cross section and an adjacent shaft anti-rotation portion having an inner surface with a non-circular cross section of predefined shape. The rotor comprises a body including a first end supporting a bearing secured by the bearing-holding means of the stator molding; a second end having a bearing surface disposed for rotation against the bearing portion of the stator; a permanent magnet portion disposed for rotation within the stator; and a threaded surface. The shaft comprises an axially displaceable end extending from the stator and means for cooperating with the rotor and the stator to convert rotational movement of the rotor to axial displacement of the shaft. Such means include a first portion of the shaft having a threaded surface disposed in the rotor body in rotatable engagement with the threaded surface of the rotor body and a second portion of the shaft including an outer surface with a cross section having the predefined shape and being slidably disposed in the shaft anti-rotation portion of the stator molding.

In accordance with a second feature of the invention the rotor comprises a generally cylindrical metallic barrier; a hub formed of a first plastic material molded to an inner surface of the barrier; and a magnet formed of a second plastic material molded to an outer surface of the barrier.

In accordance with a third feature of the invention the motor includes a housing disposed around the stator and a connector means having externally-accessible terminals which are electrically connected to at least one winding of the stator. The stator includes at least one bobbin including first and second sidewalls between which the at least one winding is disposed. The first sidewall is located toward a first axial end of the stator, has a peripheral portion with at least one notch of predetermined depth, and the housing extends over the peripheral portion of the first sidewall. The connector means comprises an insulating body molded around the terminals. Each of the terminals has a first part which is accessible externally of the stepper motor and a second part extending through the at least one notch transversely of the first sidewall. Each terminal is electrically connected to a wire forming the at least one winding. The predetermined depth of the notch is sufficiently large to ensure that a clearance exists between the second part of the terminal and the housing.

In accordance with a fourth feature of the invention the motor also includes a housing disposed around the stator and a connector means having externally-accessible terminals which are electrically connected to at least one winding of the stator. The stator comprises at least one bobbin having first and second sidewalls including respective plates of magnetically-permeable material between which the at least one winding is disposed. The housing comprises magnetically-permeable material and includes a plurality of portions which are deformed into respective regions between the first and second sidewalls of the at least one bobbin to force the housing into contact with the plates and provide a decreased-reluctance magnetic return path for a magnetic field produced by said at least one winding.

In accordance with a fifth feature of the invention the motor includes a housing disposed around the stator and a shaft coupled to the rotor such that rotation of the rotor effects linear motion of the shaft. The shaft extends axially out of an opening in a tubular end of the stator and includes first and second ends. The first end is coupled to the rotor and the second end is attached to an operative member. The tubular end of the stator has an outer surface of predefined cross-sectional shape. A tubular member having the same cross-sectional shape extends axially from the operative member and around the tubular portion of the stator. The tubular member, the tubular end of the stator and the opening in the tubular end define a labyrinthal path that inhibits the passage of contaminants from outside of the motor into the rotor.

In accordance with a sixth feature of the invention the motor also includes a housing disposed around the stator and includes means for mounting the motor. The mounting means comprise a cylindrical end portion of the housing having a central axis and a mounting flange rotatably attached to the cylindrical end portion. The end portion includes, in sequence, a first circumferential region including first means for pressing against a rigid surface of an object to which the motor is to be mounted; a second circumferential region including second means projecting from an outer surface of the cylindrical end portion to a predetermined radial distance from the central axis; and a third circumferential region having a predetermined outer diameter. The mounting flange has a circular opening defined by a bevelled inner surface which increases in diameter from the third region toward the second region. The bevelled inner surface engages the second means and locks the flange against rotation when the flange is axially forced toward the first region.

BRIEF DESCRIPTION OF THE DRAWING

FIG. 1 shows a typical application of a stepper motor having a linearly-movable shaft.

FIG. 3 is a side view, largely in cross section, of the

FIG. 3a is an enlarged view of a portion of the stepper motor illustrated in FIG. 3.

FIG. 4 is a side view, in cross section, of a stator incorporated in the stepper motor of FIG. 2.

FIGS. 5a and 5b are end and side views, respectively, of a stator pole piece incorporated in the stator of FIG. 4.

FIG. 7 is a side view of a shaft incorporated in the stepper motor of FIG. 2.

FIG. 8 is a top view of a portion of the stepper motor of FIG. 3.

FIGS. 9a, 9b, 9c and 9d are side views of end portions of electrical terminals shown in FIG. 8.

FIG. 10 is a cross-sectional view of the stepper motor of FIG. 3, taken along the section 10—10.

DESCRIPTION OF THE PREFERRED EMBODIMENT

Figure 2:
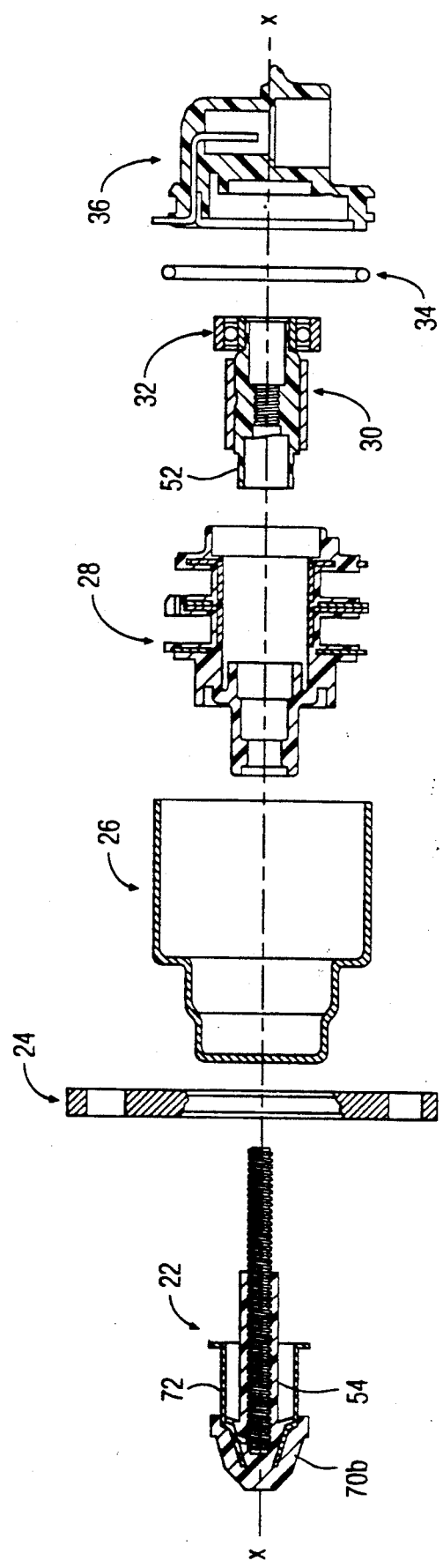
FIG. 2 is an exploded view, partly in cross section of a stepper motor constructed in accordance with the invention. assembled stepper motor of FIG. 2.

FIG. 2 illustrates the component parts of a stepper motor constructed in accordance with the invention. The parts, which are assembled along a central axis x-x of the motor, include a shaft 22, a flange 24, a housing 26, a stator 28, a rotor 30, a ball bearing 32, a elastomer O-ring seal 34, and an electrical connector 36. The assembled stepper motor is illustrated in FIG. 3.

The stator 28, which serves as a central building block of the stepper motor, is separately illustrated in FIG. 4. One of four identical pole plates incorporated in the stator is shown in end view in FIG. 5a and in front view in FIG. 5b. Each pole plate includes a number of integral poles (six in this exemplary motor). The stator is a monolithically-molded assembly which is formed by injection molding a plastic material such as polybutylene terephthalate around the four pole plates 38a, 38b, 38c, 38d. The pole plates are arranged in two pairs 38a, 38b and 38c, 38d, which are overmolded to form two respective molded bobbins 40 and 42. The two pole pieces are arranged with respect to each other such that their poles intermesh, but do not touch, as is well known in the art.

The stator molding is hollow and includes respective portions defining an opening 44 at a first end for closely holding the bearing 32, a central opening 46 within the pole pieces for receiving a central, magnetic portion of the rotor 30, and first and second functional openings 48 and 50 at a second end. First opening 48 receives a cylindrical end 52 of the rotor 30 and has an inner surface which cooperates with an outer surface of the end 52 to form a journal bearing. Second opening 50 slidably receives a portion 54 of the shaft 22 and has a non-circular shape (when viewed along the axis x-x) which corresponds with that of the shaft portion 54. This shape must be non-circular to prevent rotation of the shaft with the rotor, and in the preferred embodiment opening 50 and shaft portion 54 are substantially square.

The rotor is illustrated in detail in FIGS. 6a through 6d, which show successive steps in its manufacture. These steps are described in the following, correspondingly-lettered paragraphs:

a. A generally-cylindrical barrier member 56 is cold formed from a metal such as aluminum. The use of the barrier member strengthens the rotor and enables different materials to be either simultaneously or sequentially molded to the inner and outer surfaces of the member. The barrier member includes an indentation 58 for preventing rotary and axial movement of moldings formed on its inner and outer surfaces. Alternatively, a perforation may be forced through the barrier member. It also includes a reduced-diameter end portion 60 for receiving the bearing 32.

b. A hub 62 is injection molded within the barrier 56 from a plastic such as polybutylene terephthalate, with a protruding cylindrical end portion 52 (which is received in the stator opening 48 to form the journal bearing). A thread 64 is molded into a central portion of the hub to rotatably engage a corresponding thread 66 on an end portion of the shaft 22. These engaging threads effect a linear displacement of the shaft along axis x—x when the rotor is rotated.

c. A highly-permanent-magnet material, such as a mixture of barium ferrite and a thermoplastic (e.g. nylon) is injection molded around the outer surface of the barrier member 56 to form a cylindrical permanent magnet 68. The magnet is magnetized either during or after the molding process in such a way as to permanently impress a number of poles disposed radially along the magnet's periphery to form pole pairs. In this exemplary embodiment there are six pole pairs.

d. The ball bearing 32 is attached to the reduced diameter end 60 of the barrier member. It is secured to the barrier member by bending the edge of end 60 away from the axis x—x.

An embodiment of the shaft 22 is illustrated in detail in FIG. 7. This embodiment is substantially identical to that shown in FIGS. 2 and 3, except that a head 70a disposed at one end of the shaft has a slightly different outer contour than a head 70b shown in those figures. The head is used in throttle body applications and the actual contour used depends on the design of the specific throttle body in which it is used.

The shaft includes a central, threaded metal rod onto which the portion 54 and the head 70(a,b) are injection molded from a plastic material such as polyphenylene sulfide. Preferably portion 54 and head 70(a,b) are molded as a single unit, as is best shown in FIG. 2. The shaft also includes a tubular metal shield 72 which has a funnel-shaped end portion 74 embedded in the head 70(a,b). Preferably the end portion 74 substantially conforms to the shape of the head, to prevent deformation of the outer surface of the head resulting from shrinkage during cooling of the molding. End portion 74 also includes a number (e.g., three) of tabs 76 which are punched inwardly from the metal shield, leaving perforations through which the plastic material forming the head flows during molding. The tabs strengthen the rigid connection between the head and the shield, and the perforations ensure continuity of the molding material on opposite sides of the funnel-shaped portion 74.

The primary function of the shield 72 is to cooperate with the stator 28 in preventing contaminants such as dirt and grime from entering the motor. As can best be seen in FIG. 3, the stator molding has at one end an outwardly extending portion 78 with the same shape as the shield, which is circular in the preferred embodiment. The portion 78 has an outside diameter which substantially matches the inside diameter of the shield. The shield, in cooperation with the extending portion 78, presents a long labyrinthal path that inhibits the entrance of contaminants into the rotor. The end of the shield disposed in the housing is flared outwardly to increase the length of the labyrinthal path and to increase the strength of the shield.

Figure 6A:
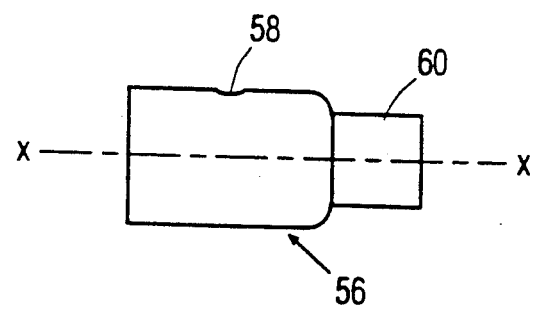
FIGS. 6a through 6d are side views, in cross section, showing successive steps in the manufacture of a rotor and bearing assembly incorporated in the stepper motor of FIG. 2.
Figure 6B:
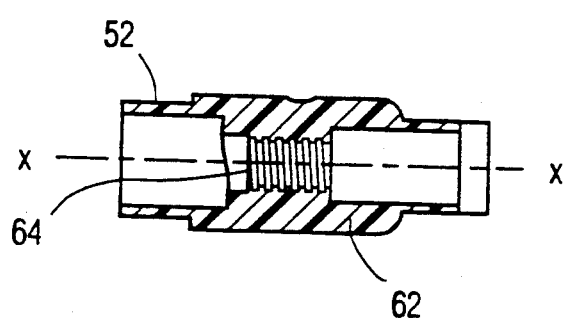
Figure 6C:
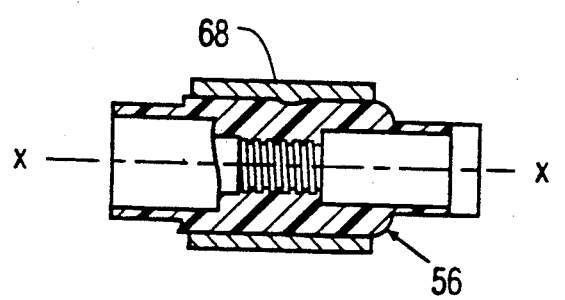
Figure 6D:
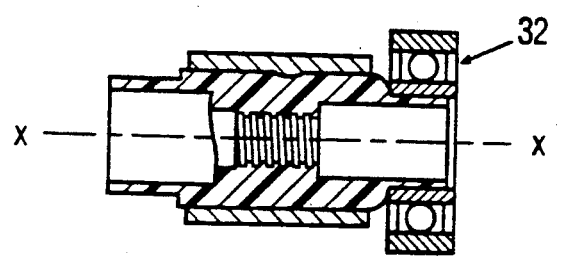

Referring to FIGS. 3, 6d and 7, the shaft also includes a circular plastic portion 80 which is integrally molded onto the threaded rod with the portion 54. Portion 80 includes an outwardly-projecting integral stop 80a which cooperates with a corresponding stop 82 molded onto an inner surface of the rotor hub 62. The two stops have axially-extending faces which are positioned such that they meet and stop rotor rotation if the shaft is drawn into the motor to a position where the flared end of the shield would otherwise be pulled against the proximal stator molding surface. This avoids excessive loading of the motor which could be required to drive the shaft out of the stator if the shield binds against the stator molding.

FIGS. 3, 4 and 8 illustrate attachment and electrical connection of the connector 36 to the stator 28. The connector is a molding of electrical insulating material, such as polyethylene terephthalate in which four electrical terminals 84a, 84b, 84c, and 84d are embedded. The terminals pass through the molding from an access port 86, for receiving a mating electrical connector (not shown), to a face which lies adjacent a sidewall of stator bobbin 42. This sidewall, in which the pole plate 38d is embedded, is notched in a region 88 to provide a receiving space for ends of the terminals. The integrally-molded sidewalls of the two bobbins, in which the pole plates 38b and 38c are embedded, are also notched in a region 90 to provide a passage to the terminal ends for the ends of a first winding 92 of insulated magnet wire wound on the bobbin 40. Similarly, a second winding 94 is provided on bobbin 42.

The method of attaching the connector and making the electrical connections will be made clear by referring to FIGS. 2, 8 and 9. The facing surfaces of the connector 36 and the stator 28 are affixed to each other, preferably by ultrasonic welding. Initially, the ends of the terminals are oriented substantially parallel to the facing surfaces, extending away from the axis x—x to facilitate electrical connection of the windings. As is illustrated in FIG. 9, the terminal ends have respective thickened portions 96a, 96b, 96c, and 96d for preventing the wire ends of the windings from slipping off of the terminals.

Each of the wire ends is first wrapped around a portion of the respective terminal disposed between the connector body and the thickened portion, and is then wrapped around the distal end of the terminal. The terminal ends and the attached wires are then dip soldered or welded and bent down into the notched region 88 far enough to avoid contact with the winding and to provide an electrically-insulating clearance between the bent terminal ends and the housing, when it is attached to the stator. There is no possibility of the terminal ends or the end wires of winding 92 contacting pole plates 38b, 38c or 38d, respectively, because each of these pole plates is oriented in the stator molding with a respective flattened portion 98 located under the regions where the notched areas are formed. (See FIG. 5a.)

As is illustrated in FIG. 3, the housing 26 is assembled over the stator 28 and over one end of the electrical connector 36 which includes a peripheral portion defining a channel in which the elastomer O-ring seal 34 is disposed. The housing is secured by bending an end portion 100 over the peripheral portion. It has been found that the operating efficiency of the motor is significantly improved by deforming small portions of the housing, made of a metal of good magnetic permeability such as low-carbon steel, into spaces above the windings to ensure that the housing contacts each of the pole plates. Only two of these indentations 102, 104 are visible in FIG. 3, but in the preferred embodiment several (e.g. three) such indentations 104 (see FIG. 10) are formed in the housing around each winding. This arrangement provides low reluctance return paths for the magnetic fields produced by the windings when they are energized.

As is best seen in FIGS. 10 and 5a, the housing further includes at least one indentation 106 which is located to engage aligned, corresponding indentations 108 in the embedded pole plates 38b and 38c to secure the housing against rotation with respect to the stator. It is not necessary that all of the indentations 108 in the pole plates be utilized.

Figure 11:
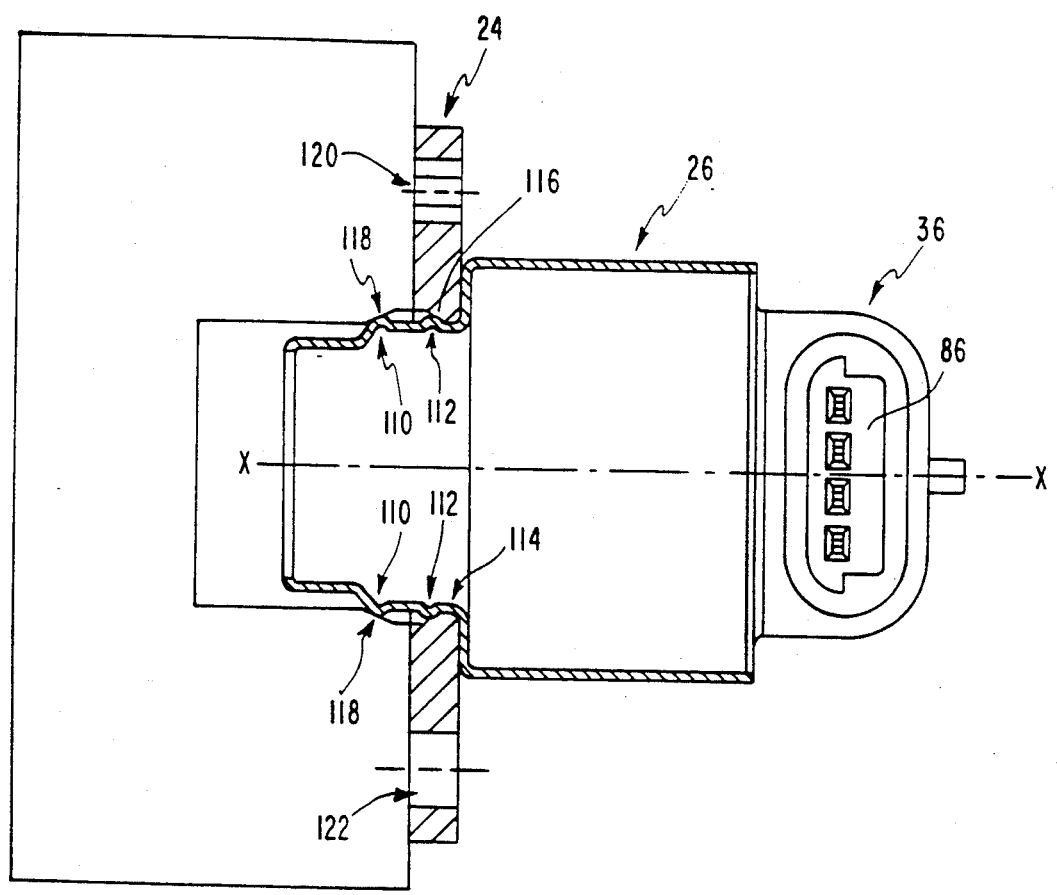
FIG. 11 is a bottom, cross-sectional view of a a housing and flange portion of the motor of FIG. 3.

FIG. 11 illustrates mounting means by which the stepper motor is attached to a body, such as the throttle body of FIG. 1, at any desired rotational position around the axis x—x. The mounting means includes the flange 24 and a cylindrical end portion of the housing 26, which are both shaped to secure the motor to the body at the desired rotational position.

The cylindrical end portion includes a first circumferential region having a number of projecting indentations 110, a second circumferential region having a number of projecting indentations 112, and a third circumferential region 114 having a smooth outer surface of radius R. The indentations 110 and 112 are evenly spaced around the cylindrical end portion, e.g. at intervals of sixty degrees.

The flange 24 has a circular opening defined by a bevelled inner surface 116 which increases in radius from a magnitude slightly greater than R, where it contacts the third circumferential region 114, to a radius slightly greater than the distance by which the indentations 112 protrude from the axis x—x. The indentations 110 are dimensioned and positioned to press against a circumferential surface 118 in the body when the flange 24 is pressed against an outer surface of the body and mounted by means such as bolts (not shown) passing through holes 120 and 122. This action also forces the projecting indentations 110 into circumferential surface 118 of the body and the projecting indentations 112 to compress against the bevelled surface 116 of the flange.

Before the indentations 112 and 110 are forced into the respective surfaces 116 and 118, the flange is free to rotate about the housing. This enables the flange to be readily adjusted to any angular position which will make the access port 86 of the connector 36 accessible to a mating connector. After the indentations 112 and 110 are forced into the respective surfaces 116 and 118, nor further rotation is possible. The indentations 112 and 110 projecting from the cylindrical end portion act as spring members when forced against the respective surfaces of the flange and the body, thus allowing repetitive mounting to the body without losing the locking ability.

We claim:

1. A stepper motor including a stator having a central axis and at least one winding disposed about the axis for producing a plurality of magnetic poles in the stator, a permanent-magnet rotor having a plurality of magnetic poles and being mounted for rotation about the axis, a housing disposed around the stator, and a connector means having externally-accessible terminals electrically connected to the at least one winding, characterized in that:

a. the stator includes at least one bobbin including first and second sidewalls between which the at least one winding is disposed, said first sidewall being located toward a first axial end of the stator and having a peripheral portion with at least one notch of predetermined depth;

b. the housing extends over the peripheral portion of the first sidewall; and c. the connector means comprises an insulating body molded around the terminals, each of said terminals having a first part which is accessible externally of the stepper motor and a second part extending through the at least one notch transversely of the first sidewall and being electrically connected to a wire forming the at least one winding, the predetermined depth of said notch being sufficiently large to ensure that a clearance exists between said second part of the terminal and the housing.

2. A stepper motor as in claim 1 where the stator includes adjacent first and second integral bobbins, each of said bobbins including first and second sidewalls between which a respective winding is disposed, the first sidewall of the first bobbin being located toward the first axial end of the stator and having said peripheral part with the at least one notch, the second sidewall of the first bobbin and the first sidewall of the second bobbin being adjacent to each other and having respective peripheral portions with notches through which electrical conductors pass for connecting the second winding to at least one of the terminals.

3. A stepper motor as in claim 2 where the electrical conductors comprise first and second ends of the winding disposed in the second bobbin.

4. A stepper motor as in claim 1 where the second part of the at least one terminal includes an end of said terminal, a first portion of predetermined thickness around which a length of the wire forming the at least one winding is wrapped, and a second portion of thickness greater than said predetermined thickness located between said end and said first portion of the terminal, said second portion preventing the wrapped length of wire from sliding off of said end.

* * * * *

UNITED STATES PATENT AND TRADEMARK OFFICE
CERTIFICATE OF CORRECTION

PATENT NO. : 5,220,224
DATED     : June 15, 1993
INVENTOR(S) : Edward T. Bosman, et al It is certified that error appears in the above-indentified patent and that said Letters Patent is hereby corrected as shown below:

On the title page, Item [75] under Inventors, delete PHILIP G. ATIYEH

Signed and Sealed this

Twenty-fourth Day of January, 1995

Attest:

BRUCE LEHMAN

*Attesting Officer*     *Commissioner of Patents and Trademarks*